(12) United States Patent
Jones et al.

(10) Patent No.: US 12,015,614 B2
(45) Date of Patent: Jun. 18, 2024

(54) AUTHENTICATION AND ACCESS MANAGEMENT FOR HETEROGENEOUS SOURCES OF ANOMALY DETECTION DATA

(71) Applicant: Ping Identity International, Inc., Denver, CO (US)

(72) Inventors: Darryl Jones, Princeton, NJ (US); Benjamin Goodman, Towaco, NJ (US); Sudhakar Peddibhotla, Seattle, WA (US)

(73) Assignee: Ping Identity International, Inc., Denver, CO (US)

( * ) Notice: Subject to any disclaimer, the term of this patent is extended or adjusted under 35 U.S.C. 154(b) by 207 days.

(21) Appl. No.: 17/673,692

(22) Filed: Feb. 16, 2022

(65) Prior Publication Data
US 2022/0263833 A1 Aug. 18, 2022

Related U.S. Application Data

(60) Provisional application No. 63/150,042, filed on Feb. 16, 2021.

(51) Int. Cl.
*H04L 9/40* (2022.01)
*H04L 29/00* (2006.01)

(52) U.S. Cl.
CPC .......... *H04L 63/102* (2013.01); *H04L 63/083* (2013.01); *H04L 63/108* (2013.01); *H04L 63/20* (2013.01)

(58) Field of Classification Search
CPC ... H04L 63/102; H04L 63/083; H04L 63/108; H04L 63/20

(Continued)

(56) References Cited

U.S. PATENT DOCUMENTS 9,720,750 B1 * 8/2017 Abrams .................. G06F 9/547
10,303,576 B1 5/2019 Seymour et al.
(Continued)

OTHER PUBLICATIONS

Protect Users Witthout Frustrating Them Using AI-Driven Behavorial Biometrics, White Pater, Behavion Sec, 2020, (retrieved Dec. 14, 2021 from https://www.behaviosec.com/wp-content/uploads/2020/11/bhs-whitepaper.pdf), p. 1.
(Continued)

*Primary Examiner* — Haresh N Patel
(74) *Attorney, Agent, or Firm* — Haynes Beffel & Wolfeld LLP; Ernest J. Beffel, Jr.

(57) ABSTRACT

The disclosed technology teaches aggregating 3rd-party risk measures during an authentication journey, including providing a risk measure aggregation node, a JSON transform, and a configuration for 3rd-party risk measures to request. Responsive to invocation of the risk measure aggregation node during the authentication journey, the method includes setting a timer for receipt of a configured 3rd-party risk measure, wherein expiration of the timer causes the risk measure aggregation node to stop waiting for a timed-out 3rd party risk measure provider and requesting the configured 3rd-party risk measures. Upon receiving at least some of the requested 3rd-party risk measures, included is applying the JSON transform to aggregate the returned 3rd-party risk measures into an aggregate score, and the risk measure aggregation node providing to another node in the authentication journey an aggregated score taking into account the configured 3rd-party risk measures received prior to expiration of the timer.

21 Claims, 6 Drawing Sheets

(58) Field of Classification Search
USPC .......................................................... 726/4
See application file for complete search history.

(56) References Cited

U.S. PATENT DOCUMENTS

| | | | | |
|---|---|---|---|---|
| 10,938,940 | B2* | 3/2021 | Alla | H04L 67/568 |
| 11,777,992 | B1* | 10/2023 | Cross | H04L 63/0876 |
| | | | | 726/5 |
| 2014/0316797 | A1* | 10/2014 | Biernacki | G16H 50/30 |
| | | | | 705/2 |
| 2015/0205708 | A1 | 7/2015 | Michelsen | |
| 2017/0295062 | A1 | 10/2017 | Tang | |
| 2018/0088982 | A1* | 3/2018 | Abrams | G06F 9/445 |
| 2018/0197128 | A1* | 7/2018 | Carstens | G06F 16/9024 |
| 2021/0004253 | A1 | 1/2021 | Barnes et al. | |
| 2021/0072966 | A1 | 3/2021 | Zong et al. | |
| 2021/0082575 | A1* | 3/2021 | Ji | G16H 40/20 |
| 2021/0173940 | A1* | 6/2021 | Mylrea | G06F 16/953 |
| 2021/0400075 | A1* | 12/2021 | Stergioudis | H04L 63/1433 |
| 2022/0030036 | A1* | 1/2022 | Cirelli | H04L 63/105 |
| 2022/0070201 | A1* | 3/2022 | Almaz | H04L 63/1425 |
| 2022/0191247 | A1* | 6/2022 | Dhoble | H04L 9/3226 |

OTHER PUBLICATIONS

Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).

Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).

Threat Matrix Guide, ID Dataweb, 7 pages (retrieved Dec. 14, 2021 from https://docs.iddataweb.com/docs/threatmetrix-1).

Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.

"Hardening your cluster's security", Kubernetes Engine, (https://cloud.google.com/kubernetes-engine/docs/concepts/security-overview), Jul. 2019, 10 pages.

Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

"Configuring Vertical Pod Autoscaling", Kubernetes Engine, Google Cloud (https://cloud.google.com/kubernetes-engine/), Aug. 14, 2019, 8 pages.

Wilkin, "Kubernetes Deployment Dependencies", https://medium.com/google-cloud/kubernetes-deployment-dependencies-ef703e563956, Jul. 2, 2018, 21 pages.

"Vertical Pod Autoscaling", Kubernetes Engine, https://cloud.google.com/kubernetes-engine/docs/concepts/verticalpodautoscaler), Aug. 29, 2019, 8 pages.

Sakimura et al, "OpenID Connect Dynamic Client Registration 1.0 incorporating errata set 1", https://openid.net/specs/openid-connect-registration-1_0.html, Oct. 1, 2019, 19 pages.

Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.

"FAQ: IDM/OpenIDM performance and tuning", https://backstage.forgerock.com/knowledge/kb/article/a32504603, Jun. 26, 2019, 7 pages.

Amazon; AWS Elastic Beanstalk Developer Guide; Aug. 2019; 924 pgs (https://web.archive.org/web/20190805110626/https:// docs.aws.amazon.com/elasticbeanstalk/latest/dg/awseb-dg.pdf).

U.S. Appl. No. 16/579,740, Notice of Allowance dated Jun. 29, 2020, 18 pages.

U.S. Appl. No. 17/068,653—Nonfinal Office Action dated Aug. 13, 2021.

U.S. Appl. No. 16/659,553 Nonfinal Office Action dated Jul. 26, 2021, 29 pages.

U.S. Appl. No. 16/659,553 Response to Nonfinal Office Action dated Jul. 26, 2021, filed Aug. 20, 2021, 11 pages.

U.S. Appl. No. 16/659,553 Notice of Allowance dated Oct. 22, 2021, 12 pages.

U.S. Appl. No. 17/068,653—Notice of Allowance dated Feb. 2, 2022.

* cited by examiner

FIG. 6

AUTHENTICATION AND ACCESS MANAGEMENT FOR HETEROGENEOUS SOURCES OF ANOMALY DETECTION DATA

PRIORITY

This application claims the benefit of U.S. Application No. 63/150,042, titled "Autonomous Access Risk Aggregation Across 3$^{rd}$ Party Applications," filed 16 Feb. 2021.

The priority application is incorporated by reference herein for all purposes.

RELATED APPLICATIONS

This application is related to the following:

- U.S. application Ser. No. 16/579,740 titled: "Secure Service Isolation Between Instances of Cloud Products Using a SaaS Model", filed Oct. 1, 2019, now U.S. Pat. No. 10,817,346 issued Oct. 27, 2020.
- U.S. application Ser. No. 17/068,653 titled: "Secure Service Isolation Between Instances of Cloud Products Using a SaaS Model", filed Oct. 12, 2020, now U.S. Pat. No. 11,347,560, issued 31 May 2022.
- U.S. application Ser. No. 15/900,475 titled "System for Controlling Access to a Plurality of Target Systems and Applications", filed 20 Feb. 2018, now U.S. Pat. No. 10,708,274, issued 7 Jul. 2020.
- U.S. application Ser. No. 16/016,154 titled "System for Controlling Access to a Plurality of Target Systems and Applications", filed 22 Jun. 2018, now U.S. Pat. No. 10,686,795, issued 16 Jun. 2020, which is a continuation-in-part of U.S. Ser. No. 15/900,475.
- U.S. application Ser. No. 16/581,087 titled "System for Controlling Access to a Plurality of Target Systems and Applications", filed 24 Sep. 2019, now U.S. Pat. No. 10,681,055, issued 9 Jun. 2020, which is a continuation of U.S. Ser. No. 15/900,475.
- U.S. application Ser. No. 16/906,953 titled "System for Controlling Access to a Plurality of Target Systems and Applications", filed 19 Jun. 2020, now U.S. Pat. No. 11,128,635, issued 21 Sep. 2021, which is a continuation of U.S. Ser. No. 15/900,475.

The related applications are incorporated by reference for all purposes.

FIELD OF THE TECHNOLOGY DISCLOSED

The technology disclosed relates generally to managing authentication and access for customers of an enterprise. More specifically the disclosed technology focuses on aggregating 3rd-party risk measures during an authentication journey for increasing security and reducing friction through the use of behavioral intelligence and modern artificial intelligence and machine learning.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud services applications and platforms authenticate and authorize their users before the users are permitted to access company resources. Similarly, enterprises authenticate and authorize their users before the permitting the users to access company resources in an on-premises installation. Providers of authentication service and authorization services work to detect anomalous access to networks, personal data, new login establishment, and transactions generally. Meanwhile, a demand exists for improving the speed and accuracy of authentication and access management.

Access management and authentication of users has evolved to more than just entering a username and password. Multi-factor authentication (MFA) is common. The process of authenticating the user and determining authorization to access to data is now described as a journey, rather than a login, due to the numerous paths that may be involved in authentication.

Heterogeneous anomaly data sources are available that help with the authentication journey. The available data is fluid, as the alternative sources advance their development of authentication metrics. The alternative data sources are invested in deterring switching between sources. An opportunity arises to unify access to heterogeneous sources, from enrollment with the sources, to access to the resources, to fulfillment. Further, an opportunity arises for aggregating 3rd-party risk measures during an authentication journey, and for configuring aggregation of 3rd-party risk measures for an authentication journey.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A demand exists for improving the speed and accuracy of authentication and access management. The disclosed technology can improve transaction security and refine personalization of authentication and access policies, resulting in minimizing friction between users and systems. Also, the disclosed technology can improve fraud detection and reduce the frequency of abandoned transactions with online payment fraud detection. Further, the disclosed technology can keep valuable transactions in efficient motion while maximizing the effectiveness of critical fraud defenses and cybersecurity risk management processes.

The technology disclosed addresses the ability to aggregate signals, from ForgeRock and from third parties, to be used at runtime in authentication and authorizations with very low latency, enabling aggregation and taking of action based on ForgeRock's and third-party risk signals at runtime. A disclosed autonomous access composer allows aggregation and weighting of risk scores from third-party risk score nodes with the autonomous access score, a confidence score in some instances.

The technology further utilizes policy and configuration for critical paths of signals, and discloses an ability to cache and use cached signals in the event that 3rd party signals are not available at the time of an authentication or authorization request.

Synchronous and asynchronous options are disclosed with a queryable autonomous access dashboard interface. A disclosed API suite delivers a prediction API for returning access scores and reasons, per user per authentication. Also disclosed is a streaming API for ingestion into security information and event management (SIEM) and other systems.

The disclosed autonomous access is scalable, in that the approach is applicable to a wide range of numbers of signals. These signals can be aggregated in a flexible customer driven manner; in one example a simple average, and in another example complex logic for determining when a requester's risk score is adequate for gaining autonomous access.

This disclosed technology is applicable for pulling many signals into runtime decisions for authentication and authorizations. Actions can be taken based on this combined intelligence before access is given to a requester, to prevent fraud or account take over. End user feedback can be utilized for training the AI-based access engine, and administrators' feedback can label the dashboard entries for further training of the AI-based access engine. Additionally, the API can utilize feedback for training the AI-based access engine.

The framework disclosed combines management of access for users with access to multiple independent anomaly detection data sources, in a single access journey. The access journey can be represented by a graph with branching among nodes that depends on how the user presents themself to the access management system, both explicitly when choosing how to authenticate and implicitly in the characteristics of the device and pathway used to seek access. In the access management system described nodes in the journey graph represent services that collect information from the user and from the anomaly detection data sources. Custom or semi-custom logic supplied by an operator of a resource server controls navigation of the graph. The module of the access graph journey logic enables access to the heterogeneous sources of anomaly detection data, invoked based on anomaly detection rules.

The next section describes an architecture suitable for configuring aggregation of multiple independent 3rd-party risk measures for an authentication journey.

Architecture

Figure 1:
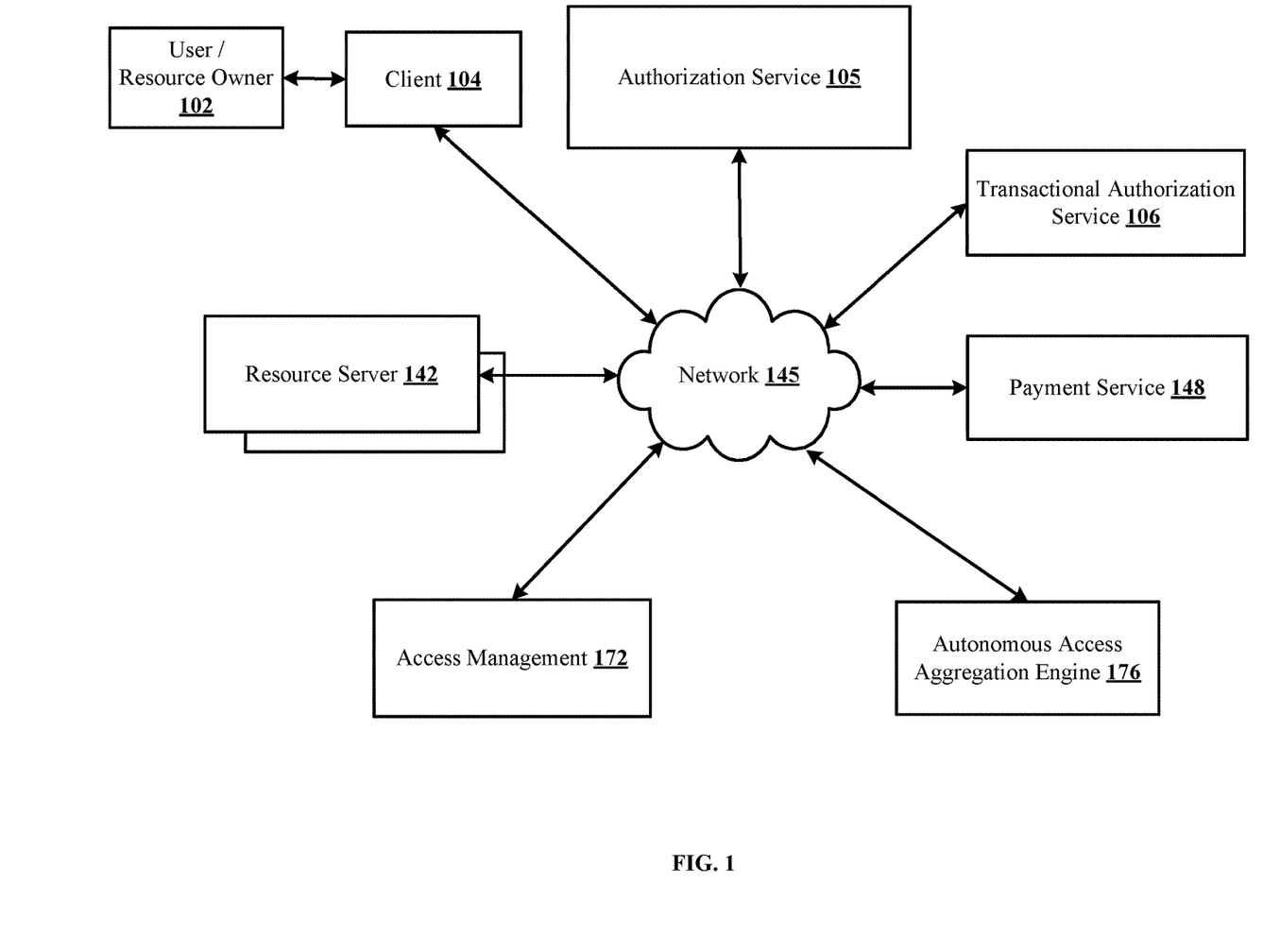
FIG. 1 shows an architectural level schematic of a system for configuring aggregation of multiple independent 3rd-party risk measures for an authentication journey, according to one embodiment of the disclosed technology.

FIG. 1 shows an architectural level block diagram of a system 100 for aggregating of multiple independent 3rd-party risk measures for an authentication journey, and for taking action based on ForgeRock's and third-party risk signals at runtime. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes user/resource owner 102 who interacts with client 104 via computers, tablets, cell phones and smart watches. Browser-based applications and third-party applications can also be delivered on additional devices not mentioned here. System 100 also includes authorization service 105, a trusted authority that responds to requests for access. System 100 also has resource server 142 that handles authenticated requests from apps, also referred to as client 104 herein, and network 145 which can be a public network or a private network, in different implementations. System 100 can include multiple applications and multiple resource servers. Browser-based applications and third-party applications communicate with authorization service 105 and resource server 142 via posted messages.

System 100 also has autonomous access aggregation engine 176 for evaluating the risk and for responding with a risk score, as described below. System 100 can further include apps such as transactional authorization service 106 and payment service 148 for completing authorized financial transactions. Transactional authorization service 106 is a domain-specific component that contacts user/resource owner 102 to authorize a transaction, confirming the intention to make the payment, using transactional authorization APIs, typically. Payment service 148 processes payment transactions requested by user/resource owner 102 via client 104, after the transaction has been authorized via authorization service 105. For each unique transaction, payment service 148 confirms the authenticity of transaction details and processes the payment transaction.

In the interconnection of the elements of system 100, network 145 couples user/resource owner 102 on computer, tablet, cell phone, smart watch, with authorization service 105 and resource server 142, transactional authorization service 106 and payment service 148 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 2:
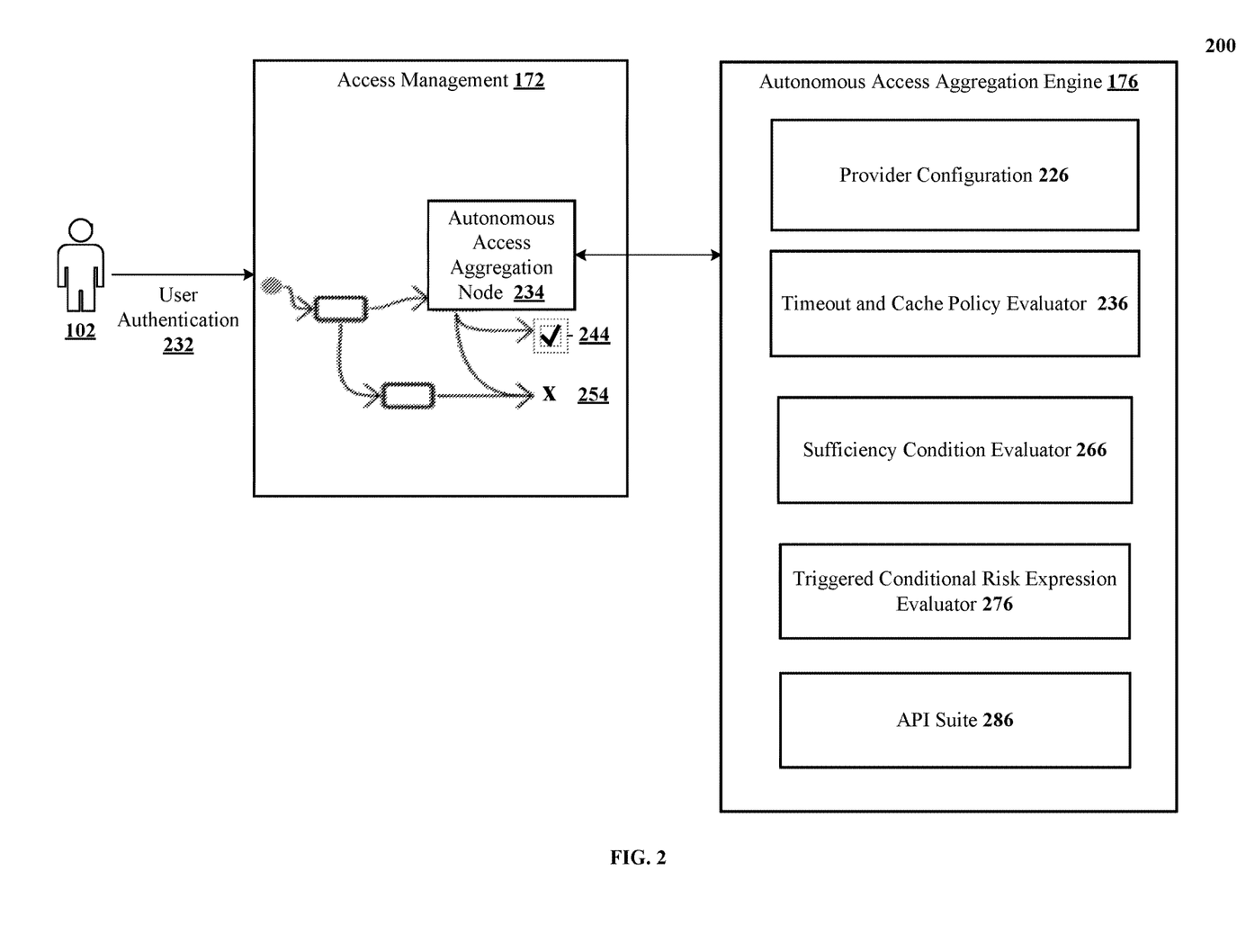
FIG. 2 shows a block diagram of an example system for aggregating of multiple independent 3rd-party risk measures for an authentication journey.

FIG. 2 shows a block diagram 200 of an example system for a user authenticating to access resources, for aggregating of multiple independent 3rd-party risk measures for an authentication journey. A journey as used in this document, is an end-to-end workflow, also referred to as an authentication tree and as a directed graph, invoked by an end user or device. Common journeys are account registration and sign-in, for example. User/resource owner 102 transmits a request to authenticate to access management 172, as user authentication 232. Access management 172 with access management journey has configured autonomous access aggregation node 234, which calls an API on Autonomous Access Aggregation Engine 176. Autonomous Access Aggregation Engine 176 evaluates the risk and responds back to autonomous access aggregation node 234. Autonomous Access Aggregation Engine 176 utilizes the returned risk score and information to either step-up access 244 such as to multi-factor authentication (MFA) or deny access to the user 254. A queryable autonomous access dashboard interface (not shown) can be included for use by administrators to add feedback to label the dashboard entries for further training of the AI-based access engine.

Continuing the description of block diagram 200, autonomous access aggregation engine 176 allows customers to select and configure the independently operated 3rd party signal providers and configure the evaluation approach for aggregating the signals from each provider. Signals from providers can include one or more of quantitative attributes and categorical attributes. Aggregation refers to the ability to utilize both ForgeRock's signals and third-party risk signals to determine a combined risk score, which is one of the key requirements for autonomous access during authentication. Autonomous access aggregation engine 176 utilizes disclosed functional blocks: provider configuration 226, timeout and cache policy evaluator 236, sufficiency condition evaluator 266, triggered conditional risk expression evaluator 276, and API suite 286. Provider configuration 226 enables the customer to choose the $3^{rd}$ party signal providers and configure the URI & credential to use the service. Provider configuration 226 receives and "reads" the $3^{rd}$-party API info. When the autonomous access aggregation node 234 calls the API, each provider of anomaly data is called in parallel, in one implementation. Timeout and cache policy evaluator 236 makes timed calls to various providers to get anomaly data from the n signal sources configured by the customer. The timer for each independent $3^{rd}$-party signal is configurable. Customers can choose to enable a cache, and can use prior results stored in cache in situations in which there is a timeout, or the respective $3^{rd}$ party service is out of service. Timeout and cache policy evaluator 236 uses the signal for each independent $3^{rd}$-party API, respectively, or the cached signal, if available, in the case of timeout. Sufficiency condition evaluator 266 evaluates the sufficiency condition for the responses, or if no response is available, evaluates the sufficiency condition for the cached results. When autonomous access aggregation engine 176 gets a response from each provider, it is possible that the information contained in the response is sufficient to respond back to the access node. To support such a case, autonomous access aggregation engine 176 includes a triggered conditional risk expression evaluator 276 that evaluates the response when a response is received, evaluates the risk expression for the triggered condition, and determines whether a sufficiency condition is met. A sufficiency condition is a condition in which there is already enough data to make an evaluation of the risk. Each sufficiency condition has a risk expression that can compute the risk score based on collected signal data. When a sufficiency condition is met, the result is returned to the caller. The four disclosed functional blocks support parallel calls for signals using configurable time conditions, sufficiency condition evaluation and flexible combination of risk expressions, depending on the data available. API suite 286 delivers a prediction API for returning access scores and reasons, per user per authentication.

Figure 3:
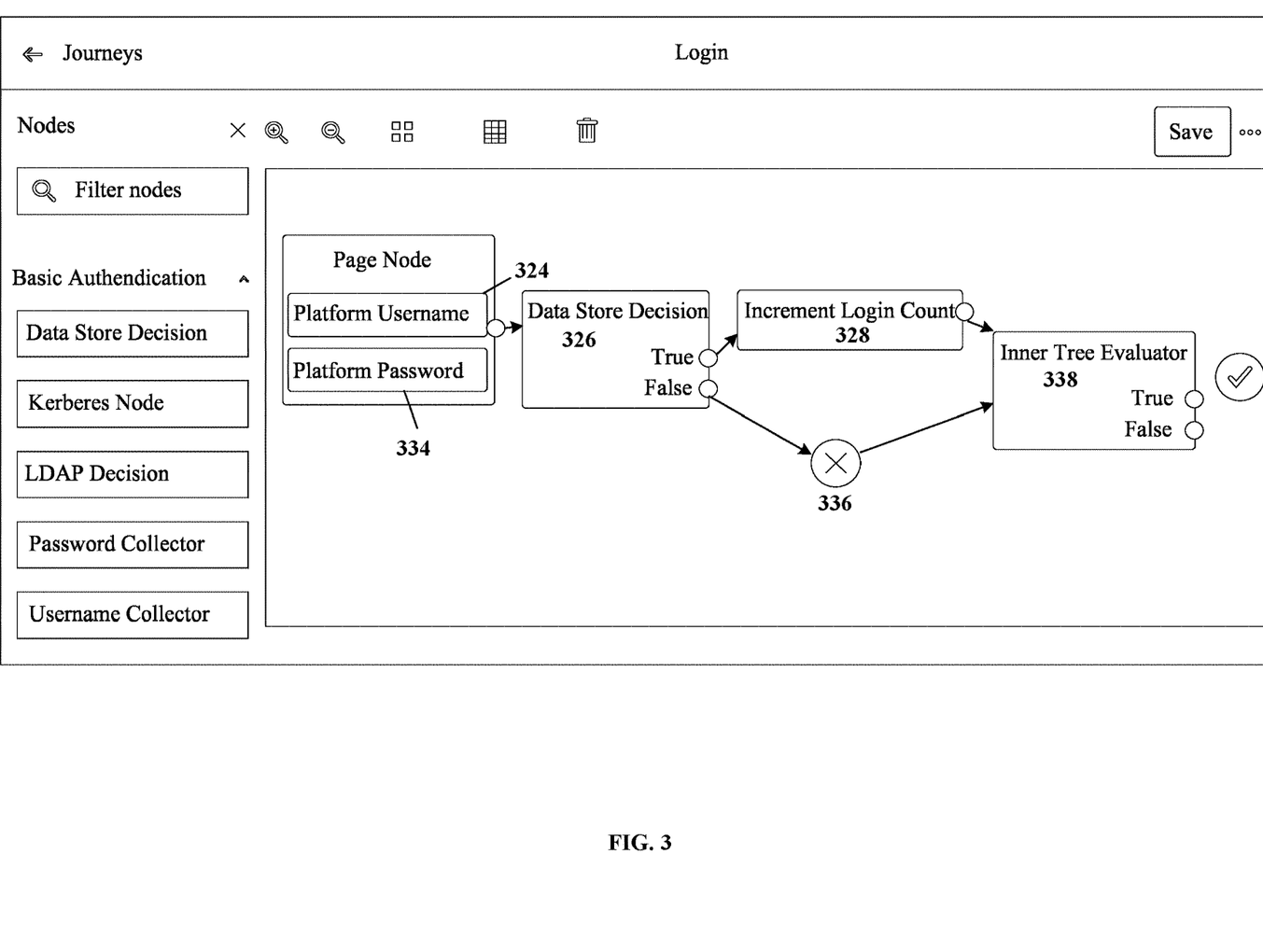
FIG. 3 shows key elements of a user authentication journey, via an example interface for configuring the nodes of an authentication journey.

FIG. 3 shows key elements of a user authentication journey, via an example interface for configuring the nodes of an authentication journey. This example journey for user authentication starts with a user providing username 324 and password 334. The next step after collecting the username and password information happens in the Data Store Decision 326 node of the authentication journey. If the result of the data store decision 326 is true, then the path of the journey goes next to increment login count 328. If the data store decision 326 results in a false, this is represented in the journey by the X 336 and the journey continues to inner tree evaluator 338. This example journey is one illustration of the power of ForgeRock's access management 172 for unifying access management for users to resource servers with access management for heterogeneous anomaly detection data sources.

Figure 4:
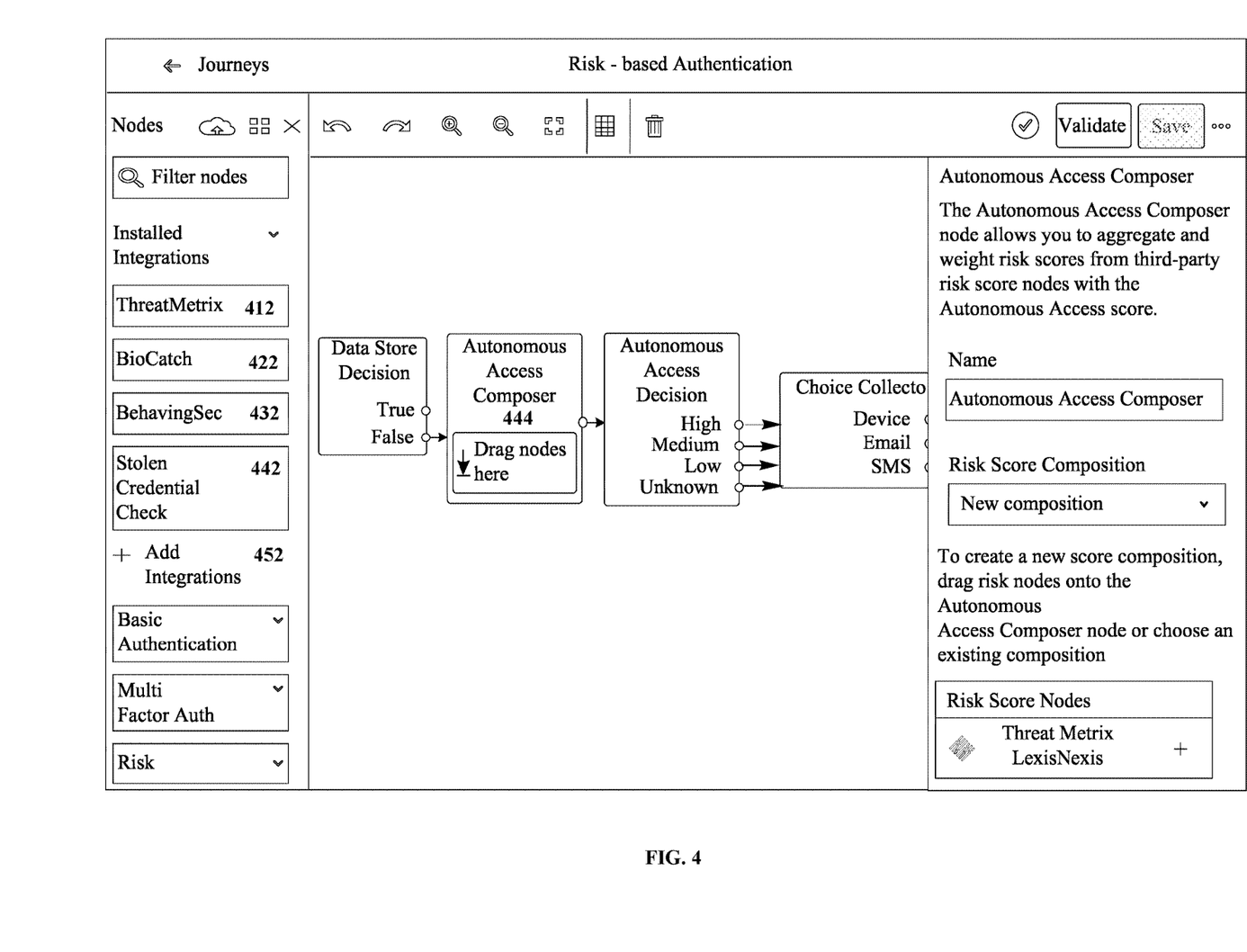
FIG. 4 shows an auto access aggregation node in an authentication tree.

FIG. 4 illustrates another example for a journey that allows customers to construct their own authentication trees and decide how to authenticate their users. One such step in an authentication tree is an Auto Access Aggregation node. FIG. 4 shows Autonomous Access Composer 444, also referred to as an auto access aggregation node, that enables users to analyze access risk data, aggregating and weighting risk scores from third-party risk score nodes, using third-party installed integrations. Example third-party integrations that provide access risk data include ThreatMetrix 412, BioCatch 422, BehavioSec 432 and Stolen Credential Check 442.

ThreatMetrix 412 combines digital identity insights built from billions of transactions, piecing together their digital identity from the complex digital DNA users create as they transact online. ThreatMetrix Guide lists assertions of conditions that return a 'pass' which means a condition was met, or a 'fail' which means that the condition was not met, as detected by ThreatMetrix. The conditions can include both quantitative attributes and categorical attributes.

BioCatch 422 is a cybersecurity company that delivers behavioral biometrics and analyzes human-device interactions to protect users and data. BioCatch Behavioral biometrics include login, phone hold, use of screen, leading to profile of user. The Behavioral biometrics that BioCatch collects are not static. For example, user behavior can vary depending on the type of device used, mood and distraction levels, the user gaining fluency with a service over time, user setting such as sitting behind a desk, walking outside, or even while carrying a cup of coffee, also referred to as categorical attributes. Behavioral biometrics for BioCatch compare current sessions to historical user profiles to detect anomalies, including human versus automated or bot activity. Signals considered include swiping, holding, tremors, press size, interaction preferences, hand-eye coordination, typing cadence and navigation preferences. Cognitive analysis based on user profiling on the population level includes use of shortcuts, selection, copy and paste, abnormal interactions, long-term memory, decision making and segmented typing to identify behavior of genuine users and criminals. Behavioral insights combine user and population-level profiles to determine user intent and emotional state in context of the activity, including duress, hesitation, distraction, process familiarity, data familiarity, being guided, user expertise and age analysis, to detect complex situations indicating high levels of risk.

BehavioSec 432 compares the behavioral biometrics of an active user against previously gathered profiles of that user or others in the user population, validating the way they physically interact online, learning how individual users hold mobile devices in their hands and press their fingers on the touchscreens, and how computer users type on keyboards and move their mouse and cursor.

Additional integrations can be installed, using the add integrations 452 feature. Examples of integrations to add include integrations for specialized vendors who offer an API to (a) get information about an IP address that reflects whether there is past data of suspicious activities from a set of IP addresses, (b) information about a device, such as whether it is jailbroken or recently stolen or associated other online database that know about its reputation, and (c) information about a user such as situations in which other data sources know about the user's profile and may define the user as suspicious. In one example, an independent $3^{rd}$ party signal uses an IP reputation tool that identifies IP addresses that send unwanted requests. Using the IP reputation list, Autonomous Access Composer 534 could reject requests that are coming from an IP address with a bad reputation. Additional specialized vendors can also offer information that can be used when composing risk scores, in another example implementation. Customers can configure Autonomous Access Composer 444 with installed integration nodes, via the drag and drop interface shown in FIG. 4, to specify third-party integrations to include in the autonomous access decision, in one example implementation. Autonomous Access Composer 444 can receive installed integration nodes via a different user interface in another implementation.

Figure 5:
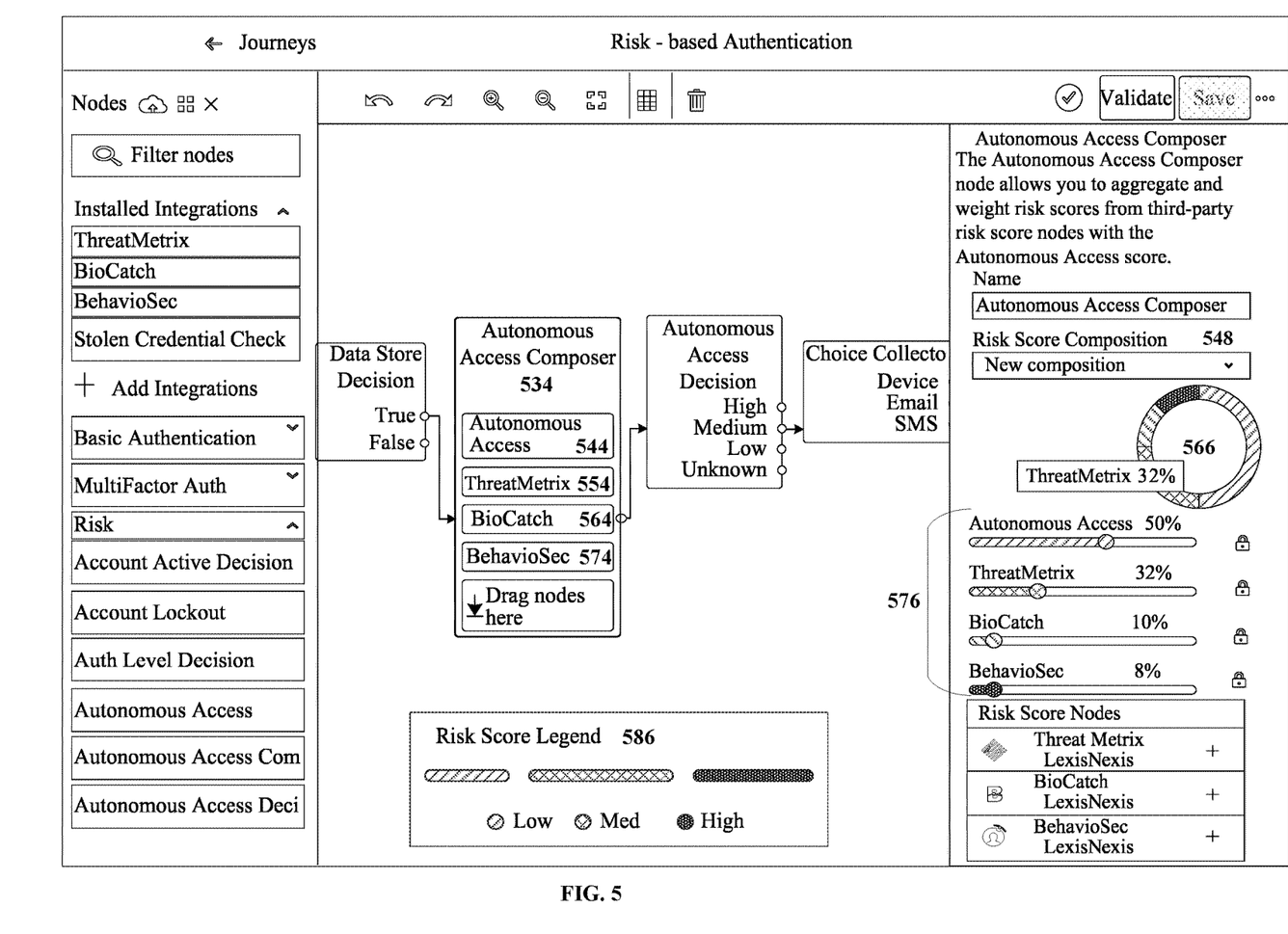
FIG. 5 illustrates an example interface for enabling a wide range of third-party fraud detection data signal choices from among risk-based nodes, via the disclosed Autonomous Access Composer populated with 3$^{rd}$ party risk signals.

FIG. 5 illustrates an example interface for enabling a wide range of third-party fraud detection data signal choices from among risk-based nodes. Autonomous Access Composer 534 is populated with multiple independent 3rd party risk signals ThreatMetrix 554, BioCatch 564 and BehavioSec 574. One or more scripted decision nodes can also be added to Autonomous Access Composer 534, adding compatibility for homegrown risk engines. Custom weights can be applied to scores in the composition of risk signals, and risk score composition aggregates signals according to risk sensitivity. Additional third party risk signals not listed here can also readily be included in some implementations.

Continuing the description of FIG. 5, risk score composition panel 548 for the autonomous access decision is configurable by the user of the interface responsive to multiple selections. The risk score composition panel 548 includes one control per independent source, that the author can manipulate and that depicts relative importance assigned by the author to the independent sources. Slide bars 576 are usable to configure weight settings in one implementation of the user interface. The user can adjust the weights to alter the calculated signal, also referred to as a score, based on $3^{rd}$ party signals. The composition is also illustrated via a donut graph 566, in one implementation of the interface for configuring risk score composition. The author of the authentication journey can configure controls on the risk score composition panel and implement the autonomous access composer with aggregation of scores returned by the independent sources according to the manipulations by the author of the controls. When a user who is configured to use the journey authenticates through the autonomous access aggregation node, the node can call an API on Auto Access and expect an aggregated risk score and response. FIG. 5 also includes an example risk score legend 586 that illustrates relative risk scores represented in three ranges: low, medium and high. In another example dashboard interface, the risk scores can be represented using numbers or a different visual scale.

One example of the type of authentication issues the disclosed methods and systems can detect is the case in which a bad actor knows enough about a user to open a new account, via identity theft or by hijacking an existing account. One risk score component can identify that the user typically uses a Mac computer, but is trying to login from a Windows 95 machine; or using an Android instead of an iPhone. In the case of a good actor, the device would be recognized. Similarly, for a good actor, their inputs would match a regular biometric pattern, including how they log in, hold their phone, select screens, etc. A grey area can include a scenario which occurs at a time and location that are typical for the user, but for whom no behavioral profile is readily available. This can be caused by use of a new device, or sometimes questionable history of the device, or the device being configured differently. In this case, friction that complicates the journey can be introduced, such as asking the user to authorize with higher level user knowledge-based question(s) to authenticate. This is plausible when a user is using someone else's computer while theirs is being repaired. Requested actions can also trigger different risk scores. For example, if a user logs in to their bank account to pay their mortgage, the transaction may be allowed. Alternatively, if the user attempts to purchase $20K of bitcoin, additional third-party fraud detection data signal choices can be utilized.

In one use case, an organization wants to make the most informed runtime risk decision around access. To do this, they want to integrate multiple signals that each provide a different risk perspective. In this example, one signal refers to IP Reputation risk, another is a User Behavioral Analytics Signal from the applicant, and a third signal is behavioral score that reflects how hard a user is pressing his keyboard. Using the disclosed technology, these signals can be combined in a robust manner at runtime and a decision can be taken. For example, the disclosed nodes can be configured. That is, the disclosed technology can be configured to "tell" the software how to navigate through the signals, and which are on the critical path given a short response time. In this example, IP Reputation and the Behavioral score are critical, so the autonomous access decision software will wait for those responses, and if the UEBA score is available, it will also be included in the response. If not, the risk-based authentication journey will make a decision based on the two signals: IP Reputation and Behavioral Score.

A device reputation provider, Vendor A, specializes in collecting and maintaining a large database of device information such as whether the device was associated with fraud in the past. They support a browser SDK that is designed to be embedded by a service provider, that gets loaded by the end user's device when the end user tries to access services. They support an API that allows a service to utilize the browser sent identifier to query the device risk profile.

A bank wants to use Vendor A solution to determine device risk, and also wants to use ForgeRock's user's behavior analytics as part of authenticating users. If either the device or the user behavior represents risk, they want to step-up authentication using multi-factor-authentication approaches. To support such a use case, ForgeRock and Vendor A create a low-code plugin that can be configured to talk to the Vendor A API and return a normalized risk score with risk reason. A simplified example of such a plugin is listed below.

In the example listed next, the plugin developer, working with ForgeRock and Vendor A, requires the http method and the uniform resource identifier (URI) as configuration and the user's session ID as a runtime parameter. The plugin calls the Vendor API and then interprets the results to create a normalized response that includes the id of the response, the risk score between 0 and 100, date and a reason. Creating a normalized response allows the aggregation engine to interpret any vendor data in a unified way.

```
let results = http(config.uri, config.method, input, sessionId)
if(results.status == '200' && results.device.history == true &&
results.device.history[0].fraudFlag == true) {
    return {
        "id" : input.user,
        "score" : 100,
        "date" : "2020-10-11T01:02:03.000Z"
        "reason" : "past fraud"
    }
}
else {
    return {
        "id" : input.user,
        "score" : 100,
        "date" : "2020-10-11T01:02:03.000Z"
        "reason" : "past fraud"
    }
}
```

The bank composes their user authentication journey by using the composer node to select both UEBA Signal and the Vendor A. They configure the composer node to apply equal weights to both signals. If any of the scores is high, the other one does not matter. Such configuration creates backend pseudo-code logic as listed next.

| Sufficiency Condition | (ueba.score != null && vendorA.score != null) \|\| (ueba.score != null && ueba.score > 80) \|\| (vendorA.score != null && vendorA.score > 80) |
|---|---|
| Aggregated Risk Signal | if (ueba.score != null && vendorA.score != null) return { "score" : config.uebaWeight * ueba.score config.vendorAWeight * vendorA.score } else if(ueba.score != null && ueba.score > 80) return { "score" : ueba.score } else if(vendorA.score != null && vendorA.score > 80) return { "score" : vendorA.score } |

When a user performs authentication, the aggregation engine runs both Vendor A risk evaluation and UEBA risk determination in parallel. The Vendor A risk is determined by execution of the Vendor A plugin. When the sufficiency condition is met, the aggregated risk signal is sent to the user authentication journey. This allows the authentication journey to setup-authentication when risk exceeds a certain threshold.

For the condition described above, if the Vendor A risk is high, the sufficiency condition is already met, and the engine no longer waits for the UEBA signal. If the UEBA score is high, the sufficiency condition is already met, and the engine no longer waits for the Vendor A response before returning the signal. If neither of the scores are high, it performs the weighted average of both. The example described above is deliberately kept concise for illustrating steps involved in parallel execution, evaluation of sufficiency condition and resultant aggregated risk output.

In a second use case, a scripted decision node can also be added to the Autonomous Access composer node. This node allows homegrown and other 3rd party risk scores to be added to the risk score. In this example we use a homegrown risk score, a UEBA signal provided by ForgeRock, and a device reputation score. In addition to the critical path through the signals, we store one to two days of previous signal results in a cache. If an important signal takes too long to return, that is, times out, the decision making can revert to use the most recent previous score.

In this use case, Vendor B is an IP reputation provider. They actively collect information about ISPs, anonymizers, and information about suspicious IP addresses, and they keep the information up to date.

A healthcare firm wants to use both Vendor B and ForgeRock's UEBA. While having Vendor B's solution is very important for them, the firm is sensitive to latency and can't affect end-user experience. So, they are OK with using slightly older data rather than making the user wait too long for Vendor B to return data that does not arrive within a configurable time limit. To achieve this balance, the corporation composes the aggregation node using Vendor B and ForgeRock UEBA signal. They configure the aggregation to wait a maximum of two seconds before using cached data if any.

When the end user authenticates, the aggregation engine runs Vendor B's plugin and the ForgeRock UEBA module in parallel. The Vendor B signal is added to the engine's cache every time it's successful. The run-time sets an upper limit of configured timeout value. If the call times out, the engine looks up past events in cache, and uses that data. If there is no entry in the cache, the engine still proceeds with evaluating the sufficiency condition and runs aggregation to respond back to the authentication journey. The JSON script is listed next.

```
start:
    fork: [ "vendorA", "ueba" ]
    vendor A:
        call:
        script: module("vendorA",input)
        result: { "vendorA" : output }
        cache: true
        timeout: 2000
    ueba:
        ...
        ...
    end:
        sufficiency: ...
        aggregate:
```

In another use case example, user information provider Vendor C maintains a database of users and their known reputation based on various information sources, including credit, criminal background, and social media. They provide an API to take recent information also into account. A public sector company wants to utilize Vendor C's user risk score as part of their authentication strategy. They want to combine Vendor C's information with the ForgeRock UEBA signal. Similar to the previous examples, the company can have the engine obtain normalized results from vendor C and the UEBA signal, and aggregate them to get a composite signal. The company can configure the journey with timeouts and cache reuse.

Computer System

Figure 6:
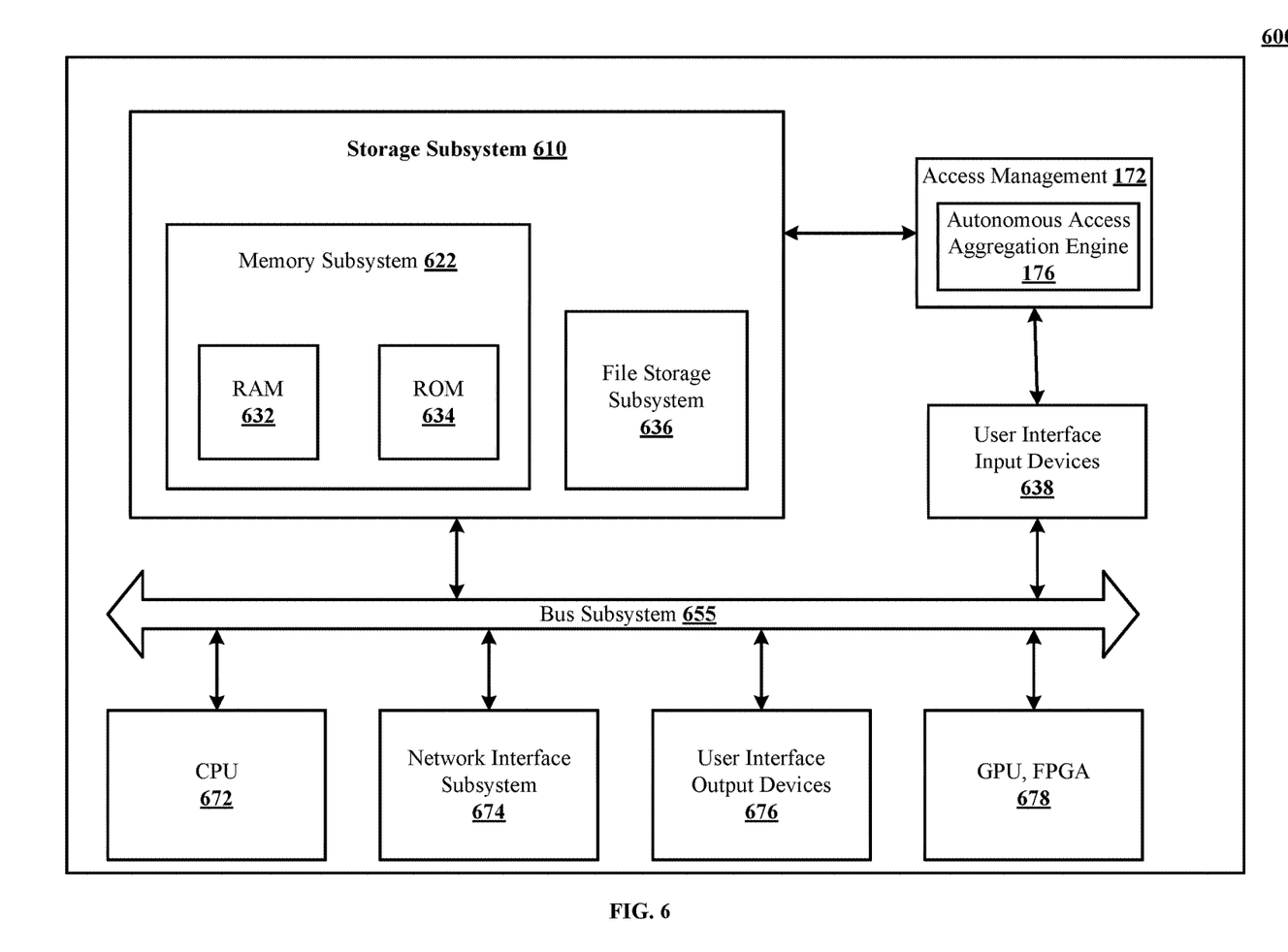
FIG. 6 is a simplified block diagram of a computer system that can be used for configuring aggregation of multiple independent 3rd-party risk measures for an authentication journey, according to one embodiment of the disclosed technology.

FIG. 6 is a simplified block diagram of a computer system 600 that can be used for aggregating 3rd-party risk measures for an authentication journey. Computer system 600 includes at least one central processing unit (CPU) 672 that communicates with a number of peripheral devices via bus subsystem 655 for providing network security services described herein. These peripheral devices can include a storage subsystem 610 including, for example, memory devices and a file storage subsystem 636, user interface input devices 638, user interface output devices 676, and a network interface subsystem 674. The input and output devices allow user interaction with computer system 600. Network interface subsystem 674 provides an interface to outside networks, including an interface to corresponding interface devices in other computer systems.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein. Subsystem 678 can be graphics processing units (GPUs) or field-programmable gate arrays (FPGAs).

Memory subsystem 622 used in the storage subsystem 610 can include a number of memories including a main random-access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple busses.

Computer system 600 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or fewer components than the computer system depicted in FIG. 6.

Particular Implementations

We describe some implementations and features for aggregating 3rd-party risk measures for an authentication journey in the following discussion.

One implementation discloses a computer-implemented method of aggregating 3rd-party risk measures during an authentication journey, including providing a risk measure aggregation node, a JSON transform, and a configuration for 3rd-party risk measures to request. Responsive to invocation of the risk measure aggregation node during the authentication journey, the method also includes setting a timer for receipt of a configured 3rd-party risk measure, wherein expiration of the timer causes the risk measure aggregation node to stop waiting for a timed-out 3rd party risk measure provider, and requesting the configured 3rd-party risk measures. Further included is receiving at least some of the requested 3rd-party risk measures, applying the JSON transform to aggregate the returned 3rd-party risk measures into an aggregate score, and the risk measure aggregation node providing to another node in the authentication journey an aggregated score taking into account on the configured 3rd-party risk measures received prior to expiration of the timer.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Many implementations of the method also include the risk measure aggregation node caching results from the 3rd party risk measure provider in a cache, the timer expiring on 3rd party risk measure provider during the authentication journey. The method further includes the risk measure aggregation node accessing the cache and retrieving some non-stale data, previously obtained from the 3rd party risk measure provider, that is responsive to the authentication journey, and the applying the JSON transform using the non-stale data from the cache.

For some implementations, returned attributes from at least one of the configured 3rd-party risk measure providers includes one or more quantitative attributes and one or more categorical attributes. For some implementations, timeout handling requires a response to the request within 0.1 to 4.0 seconds or any range bounded by this interval. In another implementation the range can be within 0.01 to 0.1 seconds. For some implementations of the method, specification of the timeout handling is an organization configurable parameter.

One implementation of the disclosed method further includes providing an API suite for invoking the risk measure aggregation node and returning details of access scores and reasons, on a per-user and per-authentication journey basis. Some implementations further include providing an API suite for invoking the risk measure aggregation node by query and receiving a readout of configuration data.

One implementation discloses a method of composing an access journey that utilizes multiple independent sources of access risk data, including receiving an indication of a selection by an author of an autonomous access composer block to position in a drag and drop sequence of access journey blocks and causing display of the autonomous access composer block and receiving indications of multiple selections by the author of independent sources of access risk data for the autonomous access composer to invoke during the access journey and causing display of the independent sources within the autonomous access composer block. The disclosed method also includes, responsive to the multiple selections, causing display of a risk score composition panel that includes one control per independent source that the author can manipulate and that depicts relative importance assigned by the author to the independent sources. The method further includes receiving indications of manipulations by the author of controls on the risk score composition panel and implementing the autonomous access composer with aggregation of scores returned by the independent sources according to the manipulations by the author of the controls. In some implementations, the display content is located adjacent to the autonomous access compose block, in a user interface.

One implementation discloses an interface for composing a risk measure aggregation node, which aggregates data from multiple independent sources of access risk data, the risk analysis node being used in an access journey represented by a directed graph. The interface includes a risk measure aggregation node composer panel that includes controls to select at least two sources of access risk data, including at least one 3rd-party source of the access risk data causing display of the selected sources as contributing to an aggregate risk score, which invokes a risk score composition panel upon completion of selection of the sources. The interface also includes the risk score composition panel that includes at least one slider or knob control for each of the selected sources of the access risk data and used to specify relative weighting of the selected sources, and a JSON script editor that combines the selected controls for at least the relative weighting of the selected sources, for evaluating the sufficiency conditions of the sources. Further included in the disclosed interface is a store for a completed risk measure aggregation node after the selection of the sources, the specification of relative weighting and editing, if any of the JSON script.

Some implementations of the interface further include in the risk measure aggregation node composer panel, a configurable timer for specifying an amount of time before access risk data previously obtained from the 3rd party risk measure provider and cached for the 3rd party source becomes stale. Timeout handling requires an amount of time within 0.1 to 4.0 seconds, or any range bounded by this interval. Other implementations of the interface also include providing an API suite panel for invoking the risk measure aggregation node and returning details of access scores and reasons, on a per-user and per-authentication journey basis, and can include an API suite for invoking the risk measure aggregation node by query and receiving a readout of configuration data.

One implementation discloses a computer-implemented method for composing a risk measure aggregation node, which aggregates data from multiple independent sources of access risk data, the risk analysis node being used in an access journey represented by a directed graph, using an interface, including a risk measure aggregation node composer panel receiving signals that manipulate controls to select at least two sources of access risk data, including at least one 3rd-party source of the access risk data causing display of the selected sources as contributing to an aggregate risk score, which invokes a risk score composition panel upon completion of selection of the sources. The method also includes the risk score composition panel receiving signals that manipulate at least one slider or knob control for each of the selected sources of the access risk data and used to specify relative weighting of the selected sources. The method further includes a JSON script editor combining at least the relative weighting of the selected sources, for evaluating the sufficiency conditions of the sources, and storing a completed risk measure aggregation node after the selection of the sources, the specification of relative weighting and editing, if any of the JSON script.

Some implementations further disclose a computer-implemented method that includes in the risk measure aggregation node composer panel, a configurable timer for specifying an amount of time before access risk data previously obtained from the 3rd party risk measure provider and cached for the 3rd party source becomes stale.

One implementation discloses a method of configuring aggregation of 3rd-party risk measures for an authentication journey, including a risk measure aggregation node, wherein the aggregation node can be configured using user interface controls such as slider bars on a GUI. The disclosed method further includes the node configuration engine generating an editable default JSON transform that combines the user interface controls, including slider settings. A final JSON transform either accepts or modifies the default. The default JSON transform, applied to a well-known 3rd-party risk measure, can include time-out handling, including cache fallback. At runtime, the aggregation node maintains a cache of signals from security measures, at least well-known 3rd-party risk measures. An editable default cache timeout is applied. The default JSON transform describes how to proceed with evaluation in case of a timeout, including whether the cache can be accessed to supply somewhat stale data on behalf of the 3rd-party risk measure that times out.

Some of the disclosed methods also include an autonomous access dashboard interface for administrators' feedback, including labeling dashboard entries for further training of a machine-learning trained classifier, and can also include the autonomous access dashboard interface being queryable. In some cases, specification of the aggregation parameters is an organization configurable rule set. In other cases, specification of the aggregation parameters is embodied in a machine-learning trained classifier.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of aggregating 3rd-party risk measures during an authentication journey, including:
providing a risk measure aggregation node, a JSON transform, and a configuration for requesting 3rd-party risk measures;
responsive to invocation of the risk measure aggregation node during the authentication journey:
setting a timer for receipt of a configured 3rd-party risk measure, wherein expiration of the timer causes the risk measure aggregation node to stop waiting for a timed-out 3 party risk measure provider;
requesting the configured 3rd-party risk measures;
receiving at least some of the requested 3"-party risk measures;
applying the JSON transform to aggregate the received 3rd-party risk measures into an aggregate score; and
the risk measure aggregation node providing to another node in the authentication journey an aggregated score taking into account on the configured 3"-party risk measures received prior to expiration of the timer.

2. The computer-implemented method of claim 1, further including:
the risk measure aggregation node caching results from the 3rd party risk measure provider in a cache;
the timer expiring on 3rd party risk measure provider during the authentication journey;
the risk measure aggregation node accessing the cache and retrieving some non-stale data, previously obtained from the 3rd party risk measure provider, that is responsive to the authentication journey; and
the applying the JSON transform using the non-stale data from the cache.

3. The computer-implemented method of claim 1, wherein returned attributes from at least one of the 3rd-party risk measure providers includes one or more quantitative attributes and one or more categorical attributes.

4. The computer-implemented method of claim 1, wherein timeout handling requires a response to the request within 0.1 to 4.0 seconds or any range bounded by this interval.

5. The computer-implemented method of claim 4, wherein specification of the timeout handling is an organization configurable parameter.

6. The computer-implemented method of claim 1, further including providing an API suite for invoking the risk measure aggregation node and returning details of access scores and reasons, on a per-user and per-authentication journey basis.

7. The computer-implemented method of claim 1, further including providing an API suite for invoking the risk measure aggregation node by query and receiving a readout of configuration data.

8. A tangible non-transitory computer readable storage media, including program instructions loaded into memory that, when executed on processors cause the processors to implement a method of aggregating 3rd-party risk measures during an authentication journey, the method including:
providing a risk measure aggregation node, a JSON transform, and a configuration for requesting 3rd-party risk measures;
responsive to invocation of the risk measure aggregation node during the authentication journey:
setting a timer for receipt of a configured 3rd-party risk measure, wherein expiration of the timer causes the risk measure aggregation node to stop waiting for a timed-out 3 party risk measure provider;
requesting the configured 3rd-party risk measures;
receiving at least some of the requested 3"-party risk measures;
applying the JSON transform to aggregate the received 3rd-party risk measures into an aggregate score; and
the risk measure aggregation node providing to another node in the authentication journey an aggregated score taking into account on the configured 3"-party risk measures received prior to expiration of the timer.

9. The tangible non-transitory computer readable storage media of claim 8, further including:
the risk measure aggregation node caching results from the 3rd party risk measure provider in a cache;
the timer expiring on 3rd party risk measure provider during the authentication journey;
the risk measure aggregation node accessing the cache and retrieving some non-stale data, previously obtained from the 3rd party risk measure provider, that is responsive to the authentication journey; and
the applying the JSON transform using the non-stale data from the cache.

10. The tangible non-transitory computer readable storage media of claim 8, wherein returned attributes from at least one of the configured 3rd-party risk measure providers includes one or more quantitative attributes and one or more categorical attributes.

11. The tangible non-transitory computer readable storage media of claim 8, wherein timeout handling requires a response to the request within 0.1 to 4.0 seconds or any range bounded by this interval.

12. The tangible non-transitory computer readable storage media of claim 11, wherein specification of the timeout handling is an organization configurable parameter.

13. The tangible non-transitory computer readable storage media of claim 8, further including providing an API suite for invoking the risk measure aggregation node and returning details of access scores and reasons, on a per-user and per-authentication journey basis.

14. The tangible non-transitory computer readable storage media of claim 8, further including providing an API suite for invoking the risk measure aggregation node by query and receiving a readout of configuration data.

15. A system for aggregating 3rd-party risk measures during an authentication journey, the system including a processor, memory coupled to the processor and program instructions from the non-transitory computer readable storage media of claim 8 loaded into the memory.

16. The system of claim 15, wherein the program instructions extend the method including:
the risk measure aggregation node caching results from the 3rd party risk measure provider in a cache;
the timer expiring on 3rd party risk measure provider during the authentication journey;

the risk measure aggregation node accessing the cache and retrieving some non-stale data, previously obtained from the 3rd party risk measure provider, that is responsive to the authentication journey; and the applying the JSON transform using the non-stale data from the cache.

17. The system of claim 15, wherein returned attributes from at least one of the configured 3rd-party risk measure providers includes one or more quantitative attributes and one or more categorical attributes.

18. The system of claim 15, wherein timeout handling requires a response to the request within 0.1 to 4.0 seconds or any range bounded by this interval.

19. The system of claim 18, wherein specification of the timeout handling is an organization configurable parameter.

20. The system of claim 15, further including providing an API suite for invoking the risk measure aggregation node and returning details of access scores and reasons, on a per-user and per-authentication journey basis.

21. The system of claim 15, further including providing an API suite for invoking the risk measure aggregation node by query and receiving a readout of configuration data.

* * * * *